(12) United States Patent
Loeffelholz et al.

(10) Patent No.: US 9,417,417 B2
(45) Date of Patent: Aug. 16, 2016

(54) FIBER OPTIC ENCLOSURE WITH INTERNAL CABLE SPOOL ASSEMBLY

(71) Applicant: CommScope Technologies LLC, Hickory, NC (US)

(72) Inventors: Todd Loeffelholz, Minnetonka, MN (US); Mao Nian Tang, Su Qian (CN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/745,582

(22) Filed: Jun. 22, 2015

(65) Prior Publication Data

US 2016/0018617 A1 Jan. 21, 2016

Related U.S. Application Data

(63) Continuation of application No. 13/043,979, filed on Mar. 9, 2011, now Pat. No. 9,063,316.

(60) Provisional application No. 61/312,733, filed on Mar. 11, 2010.

(51) Int. Cl.
*G02B 6/00* (2006.01)
*G02B 6/44* (2006.01)
*G02B 6/38* (2006.01)

(52) U.S. Cl.
CPC ............ *G02B 6/4455* (2013.01); *G02B 6/4441* (2013.01); *G02B 6/4457* (2013.01); *G02B 6/4466* (2013.01); *G02B 6/4477* (2013.01); *G02B 6/3897* (2013.01); *G02B 6/4454* (2013.01)

(58) Field of Classification Search
CPC ............................ G02B 6/4454; G02B 6/4457
USPC ........................................................ 385/135
See application file for complete search history.

(56) References Cited

U.S. PATENT DOCUMENTS

| 5,956,449 | A | 9/1999 | Otani et al. |
| 6,215,938 | B1 * | 4/2001 | Reitmeier ............ G02B 6/4441 385/134 |
| 6,220,413 | B1 | 4/2001 | Walters et al. |
| 7,715,679 | B2 | 5/2010 | Kowalczyk et al. |

(Continued)

FOREIGN PATENT DOCUMENTS

| CN | 1914776 A | 2/2007 |
| KR | 20-0380996 | 3/2005 |

(Continued)

OTHER PUBLICATIONS

European Search Report for Application No. 11754002.1 mailed Apr. 16, 2014.

(Continued)

*Primary Examiner* — Ryan Lepisto
*Assistant Examiner* — Erin Chiem
(74) *Attorney, Agent, or Firm* — Merchant & Gould P.C.

(57) ABSTRACT

A fiber optic enclosure includes a housing having a base and a cover. The base and the cover cooperate to define an interior region. A cable spool assembly is disposed in the interior region of the housing and is rotatably engaged to the base. The cable spool assembly includes a drum portion and a tray assembly engaged to the drum portion. The tray assembly includes a first tray and a second tray mounted to the first tray. A fiber optic distribution cable is wrapped about the drum portion of the cable spool assembly.

20 Claims, 17 Drawing Sheets

(56) References Cited

U.S. PATENT DOCUMENTS

| | | | |
|---|---|---|---|
| 7,756,379 | B2 | 7/2010 | Kowalczyk et al. |
| 7,869,682 | B2 | 1/2011 | Kowalczyk et al. |
| 8,009,954 | B2 | 8/2011 | Bran de Leon et al. |
| 8,265,447 | B2 | 9/2012 | Loeffelholz et al. |
| 9,063,316 | B2 | 6/2015 | Loeffelholz et al. |
| 2008/0292261 | A1 | 11/2008 | Kowalczyk et al. |
| 2009/0060441 | A1* | 3/2009 | Kowalczyk ......... G02B 6/4441 385/135 |
| 2009/0074370 | A1 | 3/2009 | Kowalczyk et al. |
| 2009/0317047 | A1 | 12/2009 | Smith et al. |
| 2011/0044599 | A1 | 2/2011 | Kowalczyk et al. |

FOREIGN PATENT DOCUMENTS

| | | |
|---|---|---|
| WO | WO 2008/137894 A1 | 11/2008 |
| WO | WO 2009/108846 A2 | 9/2009 |
| WO | WO 2010/001160 A1 | 1/2010 |
| WO | WO 2011/156969 | 12/2011 |

OTHER PUBLICATIONS

International Search Report and Written Opinion mailed Nov. 30, 2011.

* cited by examiner

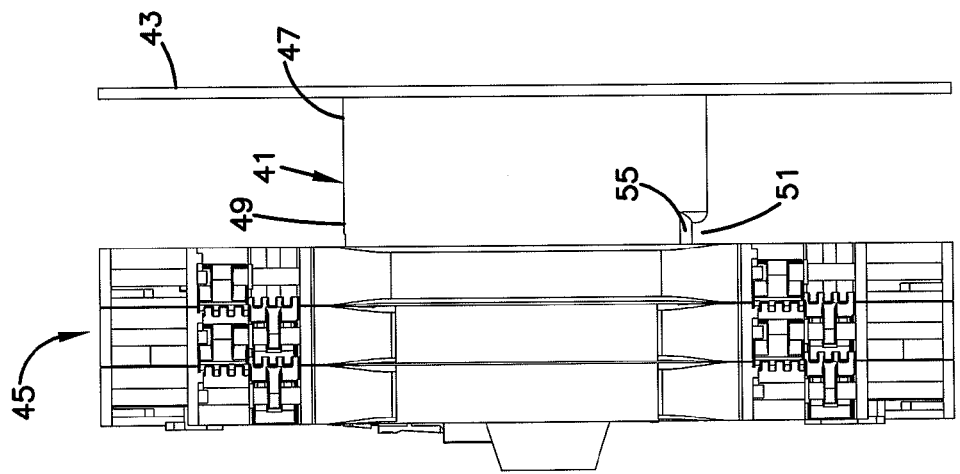
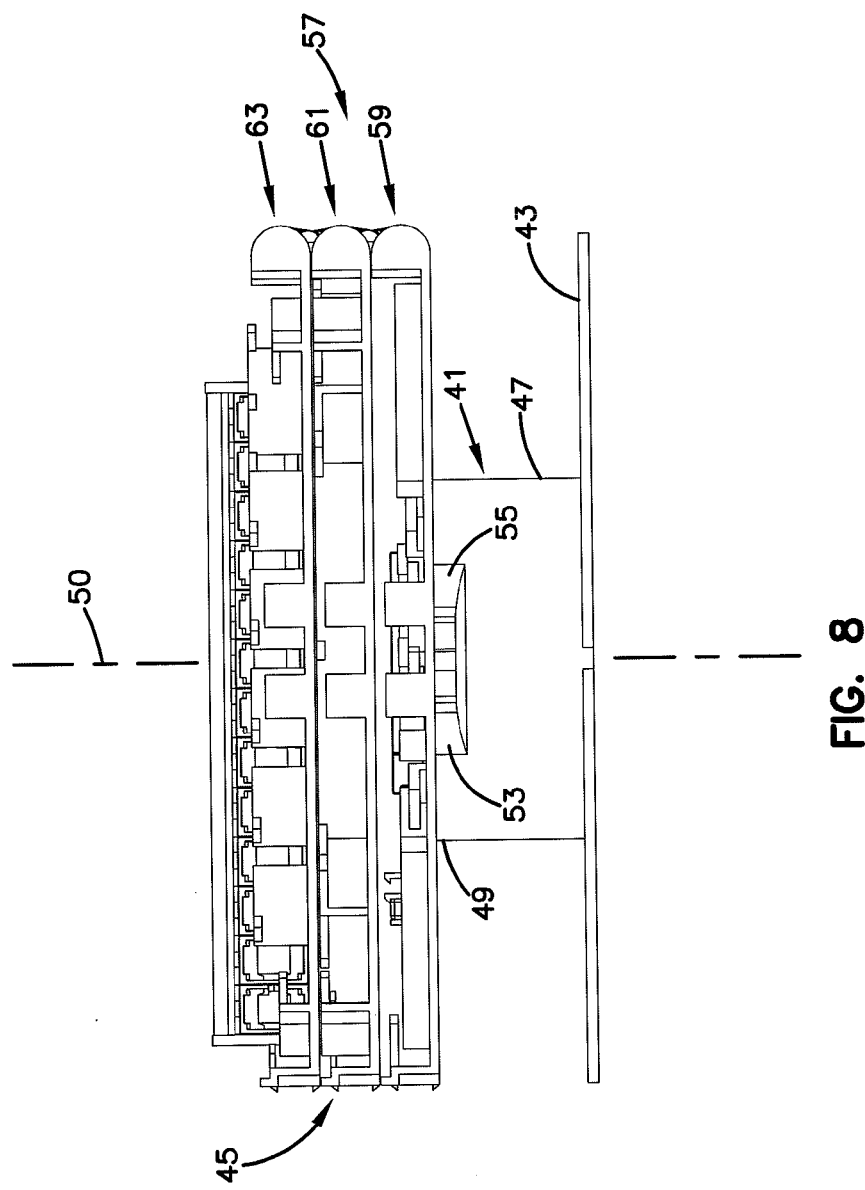

US 9,417,417 B2

FIBER OPTIC ENCLOSURE WITH INTERNAL CABLE SPOOL ASSEMBLY

This application is a continuation of application Ser. No. 13/043,979, filed Mar. 9, 2011, now issued as U.S. Pat. No. 9,063,316, which application claims the benefit of provisional application Ser. No. 61/312,733, filed Mar. 11, 20101, which applications are incorporated herein by reference in their entirety.

CROSS-REFERENCE TO RELATED APPLICATIONS

This application is a continuation of application Ser. No. 13/043,979, filed Mar. 9, 2011, which application claims the benefit of provisional application Ser. No. 61/312,733, filed Mar. 11, 20101, which applications are incorporated herein by reference in their entirety.

BACKGROUND

As demand for telecommunications increases, fiber optic networks are being extended in more and more areas. In facilities such as multiple dwelling units, apartments, condominiums, businesses, etc., fiber optic enclosures are used to provide a subscriber access point to the fiber optic network. These fiber optic enclosures are connected to the fiber optic network through subscriber cables connected to a network hub. However, the length of subscriber cable needed between the fiber optic enclosure and the network hub varies depending upon the location of the fiber optic enclosure with respect to the network hub. As a result, there is a need for a fiber optic enclosure that can effectively manage varying lengths of subscriber cable.

SUMMARY

An aspect of the present disclosure relates to a fiber optic enclosure. The fiber optic enclosure includes a housing having a base and a cover. The base and the cover cooperate to define an interior region. A cable spool assembly is disposed in the interior region of the housing and is rotatably engaged to the base. The cable spool assembly includes a drum portion and a tray assembly engaged to the drum portion. The tray assembly includes a first tray and a second tray mounted to the first tray. A fiber optic distribution cable is wrapped about the drum portion of the cable spool assembly.

Another aspect of the present disclosure relates to a fiber optic enclosure. The fiber optic enclosure includes a housing having a base and a cover. The base and the cover cooperate to define an interior region. A cable spool assembly is disposed in the interior region of the housing and is rotatably engaged to the base. The cable spool assembly includes a drum portion and a tray assembly engaged to the drum portion. The tray assembly includes a plurality of trays. The plurality of trays is disposed in a stacked configuration. A fiber optic distribution cable is wrapped about the drum portion of the cable spool assembly. The fiber optic distribution cable having an end portion that is routed from the drum portion to the tray assembly.

Another aspect of the present disclosure relates to a fiber optic enclosure. The fiber optic enclosure includes a housing having a base and a cover. The base and the cover cooperate to define an interior region. A cable spool assembly is disposed in the interior region of the housing and is rotatably engaged to the base. The cable spool assembly includes a drum portion, a flange and a tray assembly. The drum portion has a first axial end portion and an oppositely disposed second axial end portion. The flange is engaged to the first axial end portion of the drum portion. The tray assembly is engaged to the drum portion. The tray assembly includes a first tray mounted to the second axial end portion of the drum portion, a second tray pivotally mounted to the first tray, and a third tray pivotally mounted to the second tray. A fiber optic distribution cable is wrapped about the drum portion of the cable spool assembly. The fiber optic distribution cable having an end portion that is routed from the drum portion to the tray assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

FIG. 8 is a front side view of the cable spool assembly of FIG. 5.

FIG. 9 is a left side view of the cable spool assembly of FIG. 5.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
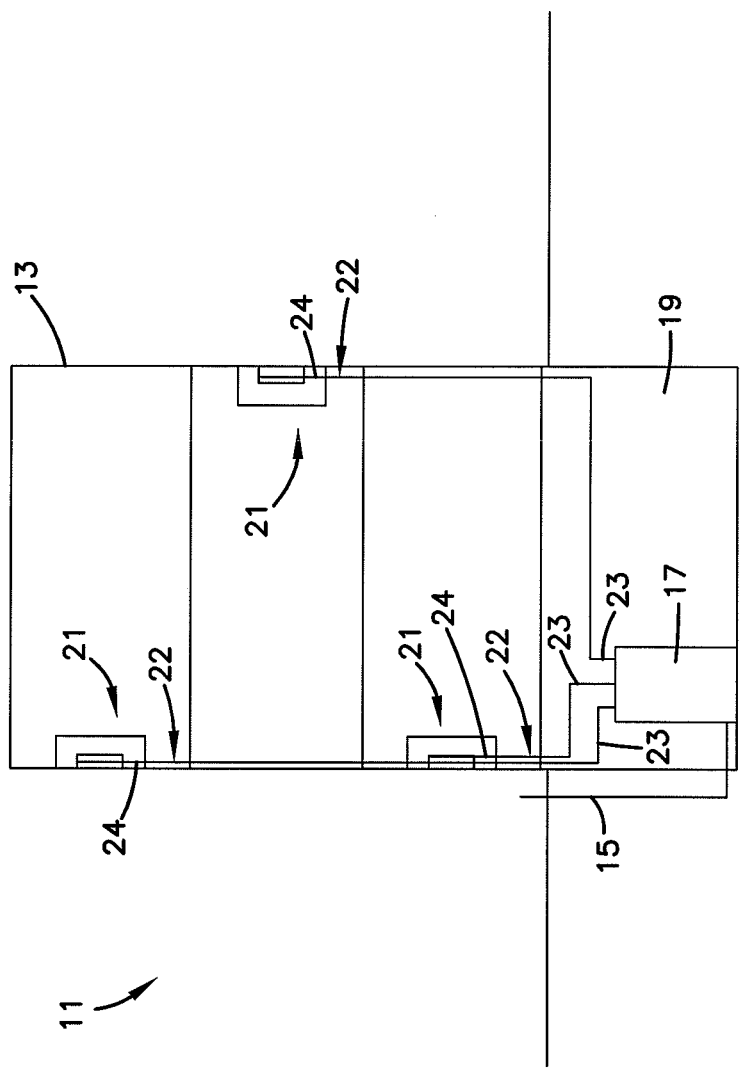
FIG. 1 is a schematic representation of a portion of a fiber optic network having exemplary features of aspects in accordance with the principles of the present disclosure.

Referring now to FIG. 1, a schematic representation of a portion of a fiber optic network, generally designated 11, is shown. In the depicted embodiment, the portion of the fiber optic network 11 is disposed in a facility 13 (e.g. individual residence, apartment, condominium, business, etc.).

The fiber optic network 11 includes a feeder cable 15 from a central office (not shown). The feeder cable 15 enters a feeder cable input location 17 (e.g., a fiber distribution hub, a network interface device, etc.) having one or more optical splitters (e.g., 1-to-8 splitters, 1-to-16 splitters, or 1-to-32 splitters) that generate a number of individual fibers. In the subject embodiment, and by way of example only, the fiber distribution hub 17 is located on a lower level 19 of the facility 13.

A fiber optic enclosure, generally designated 21, is disposed in the facility. In the depicted embodiment, each unit of the facility includes a fiber optic enclosure 21. A distribution cable 22 extends between the fiber optic enclosure 21 and the fiber distribution hub 17. In one embodiment, a first end portion 23 of the distribution cable 22 is optically connected with the fiber distribution hub 17 while a second end portion 24 of the distribution cable 22 is engaged with the fiber optic enclosure 21. In one embodiment, the distribution cable 22 extending between the fiber distribution hub 17 and the fiber optic enclosure 21 includes multiple optical fibers.

Figure 2:
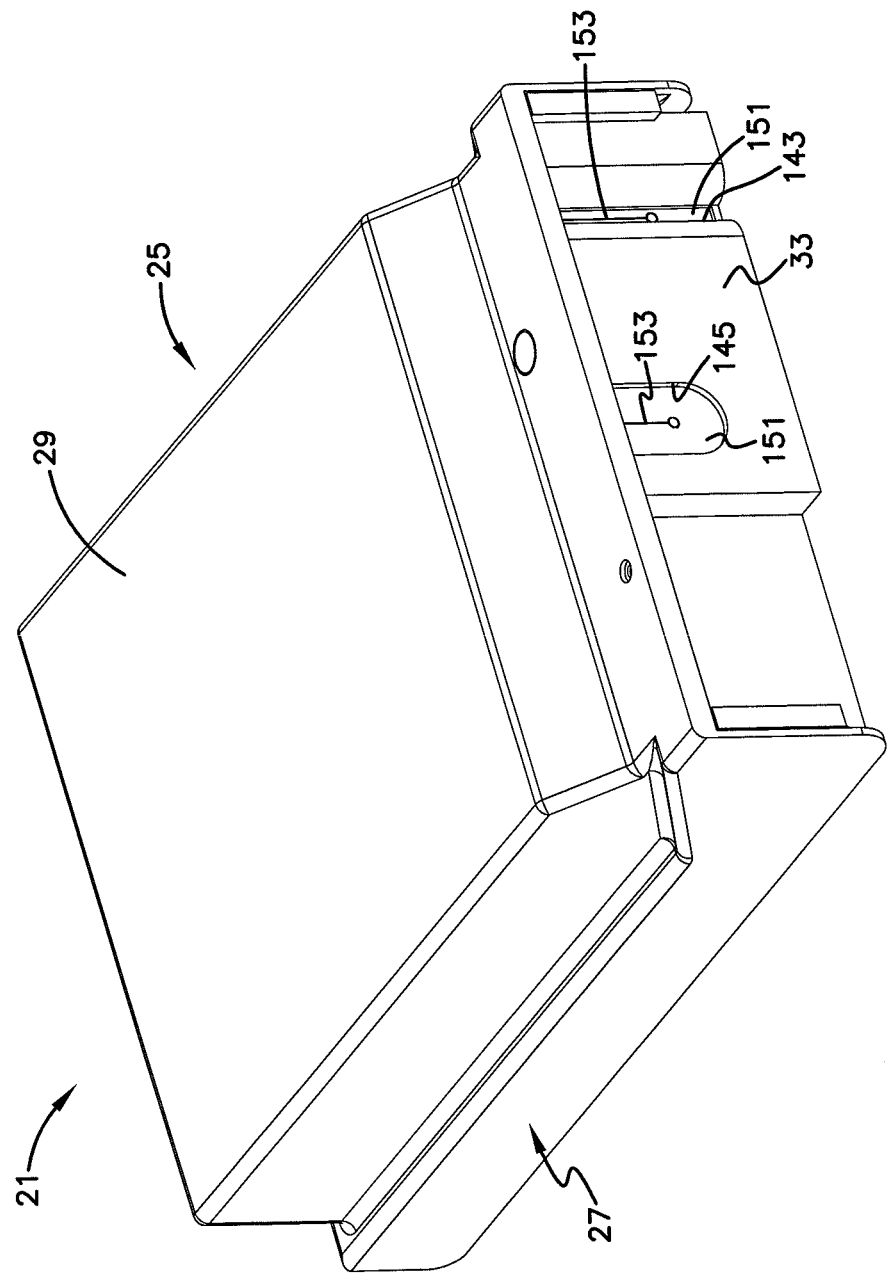
FIG. 2 is a perspective view of a fiber optic enclosure having exemplary features of aspects in accordance with the principles of the present disclosure.
Figure 3:
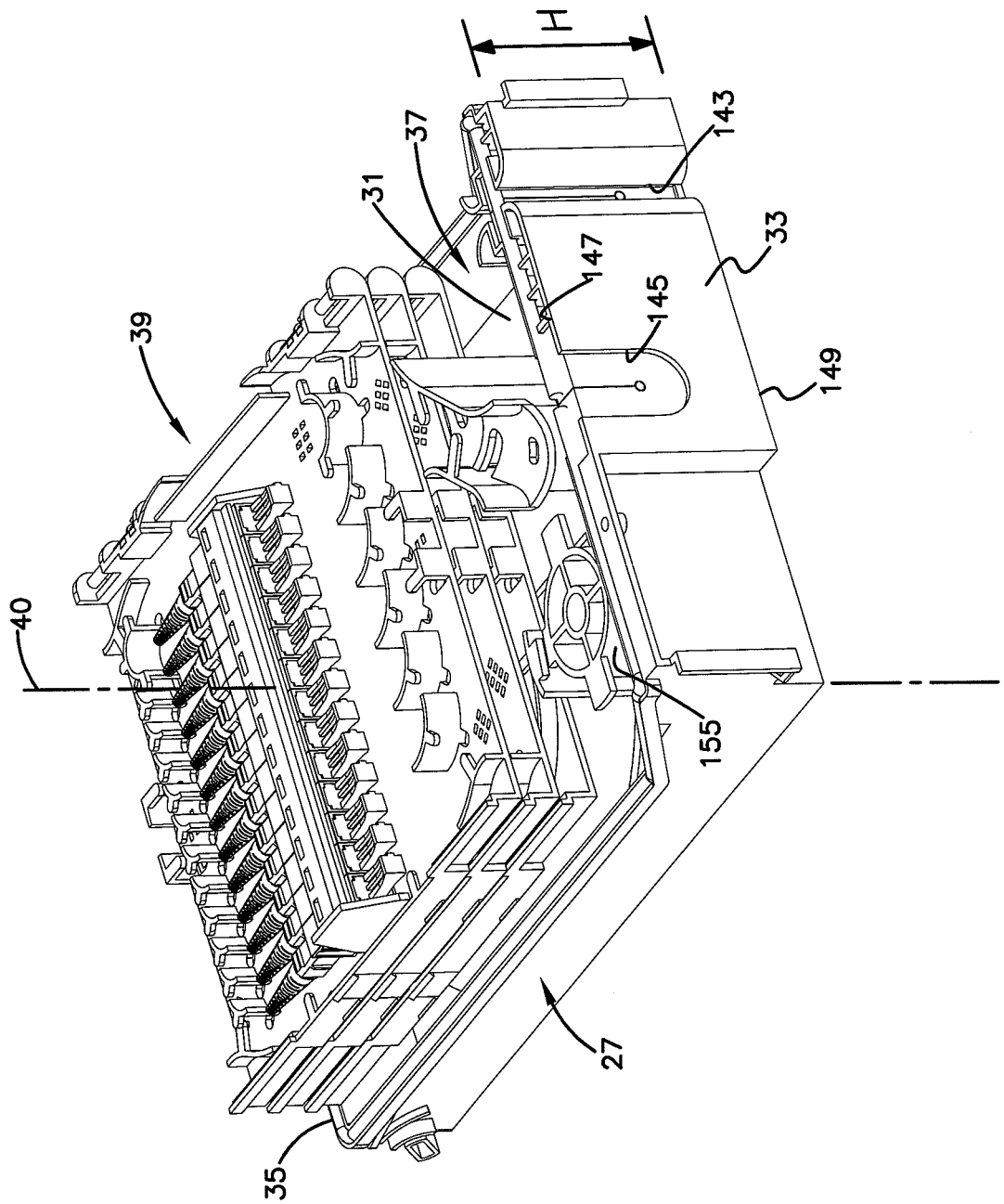
FIG. 3 is a perspective view of the fiber optic enclosure of FIG. 2 with a cover removed.
Figure 4:
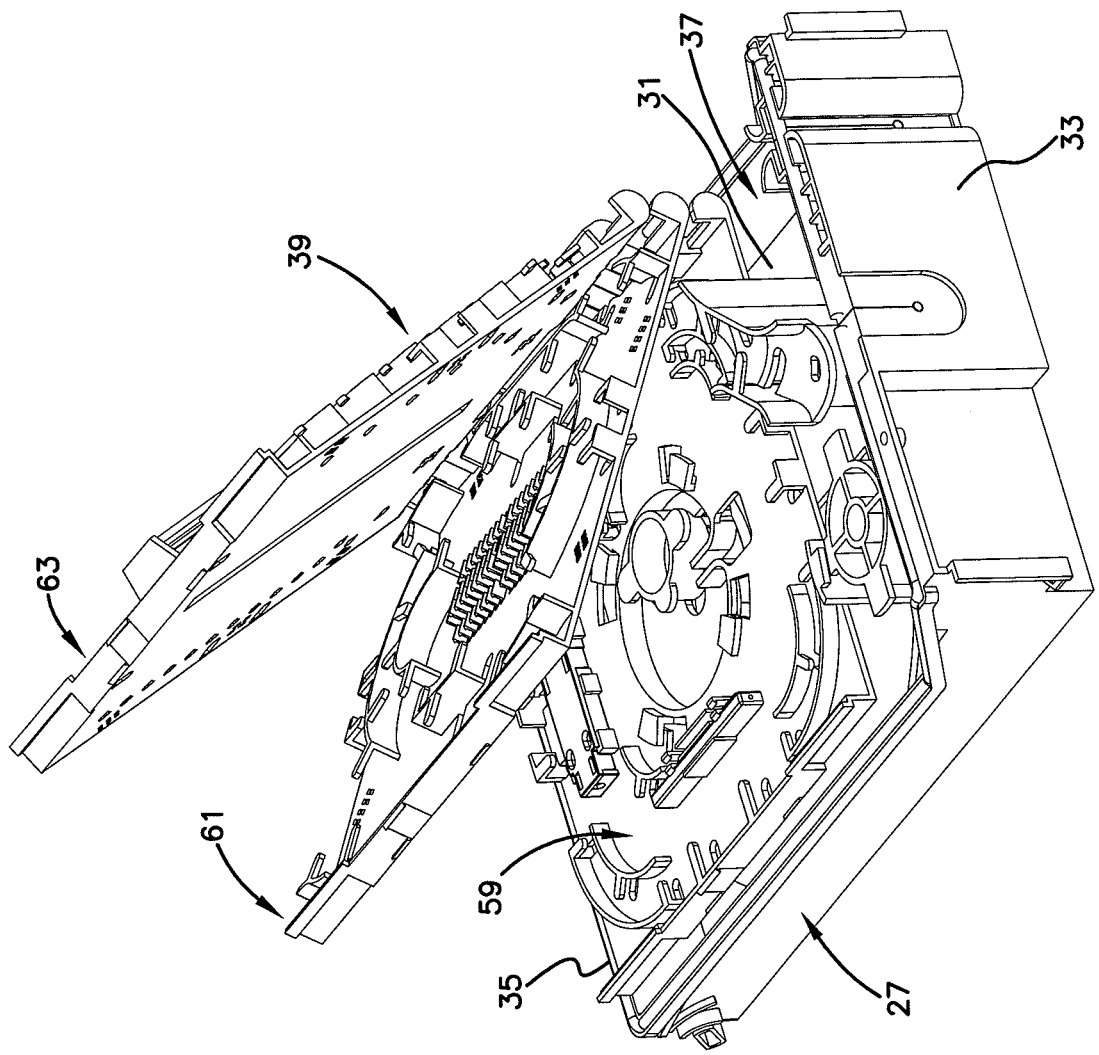
FIG. 4 is a perspective view of the fiber optic enclosure with a tray assembly shown in an open position.
Figure 5:
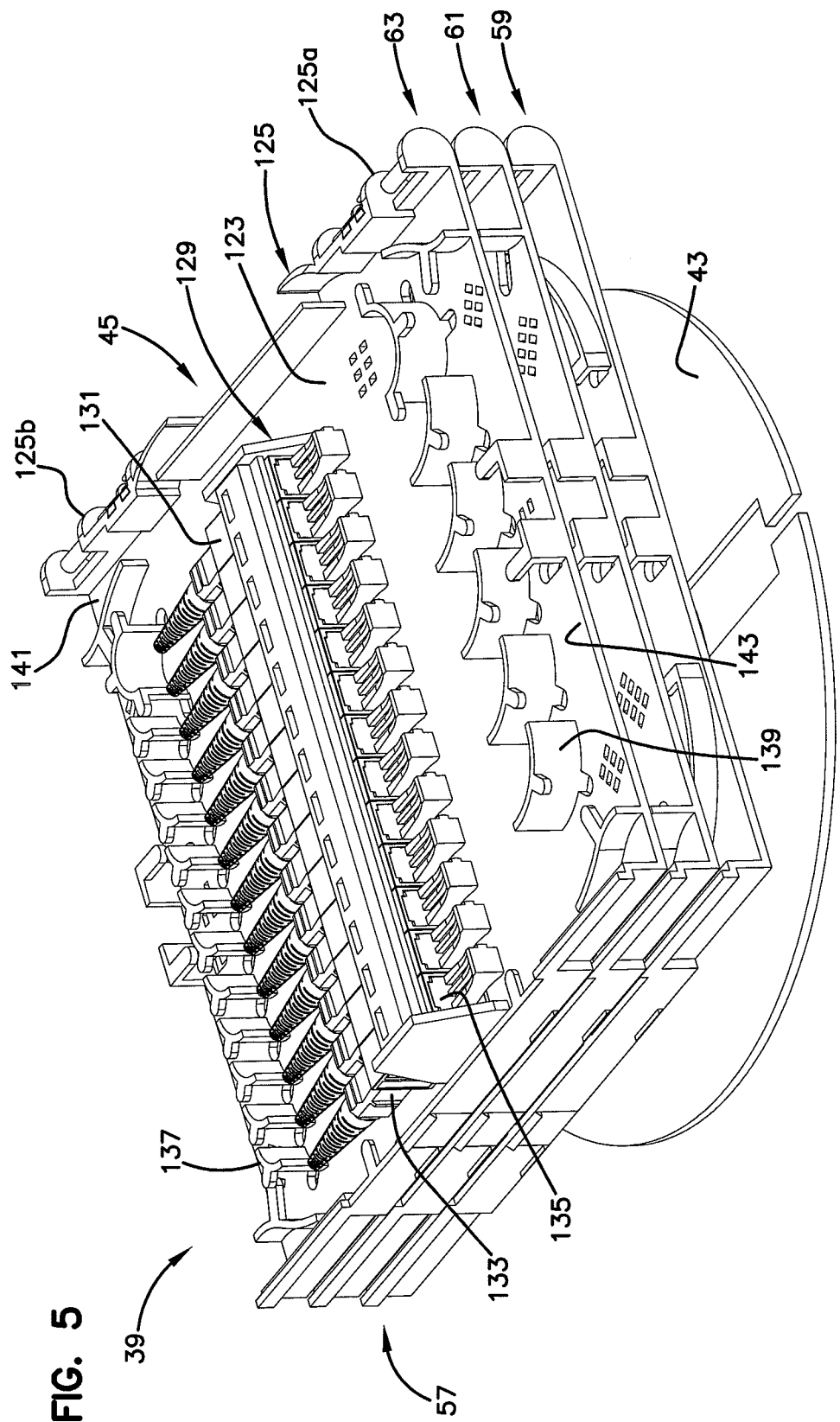
FIG. 5 is a perspective view of a cable spool assembly suitable for use with the fiber optic enclosure of FIG. 3.
Figure 6:
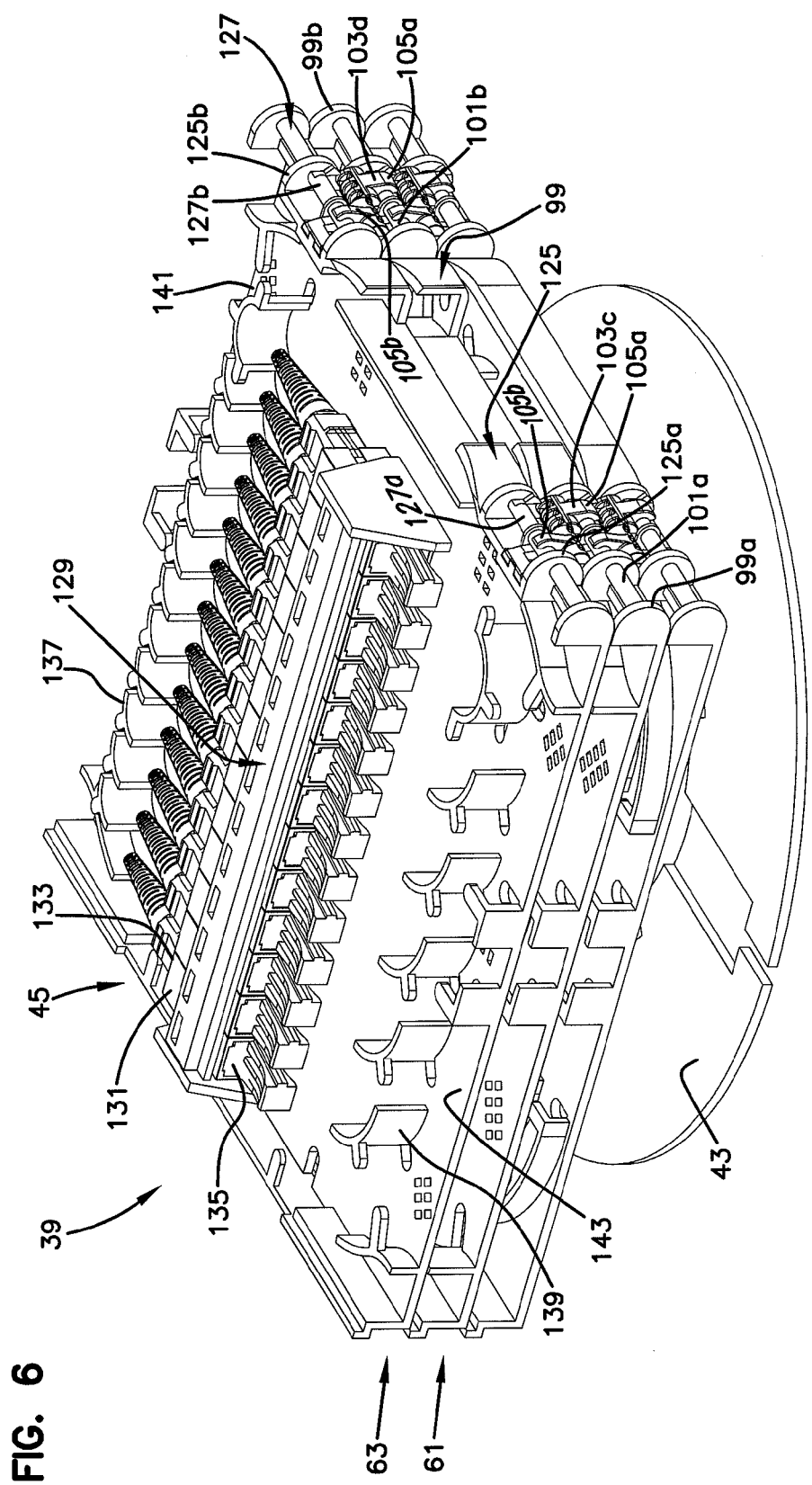
FIG. 6 is another perspective view of the cable spool assembly of FIG. 5.
Figure 7:
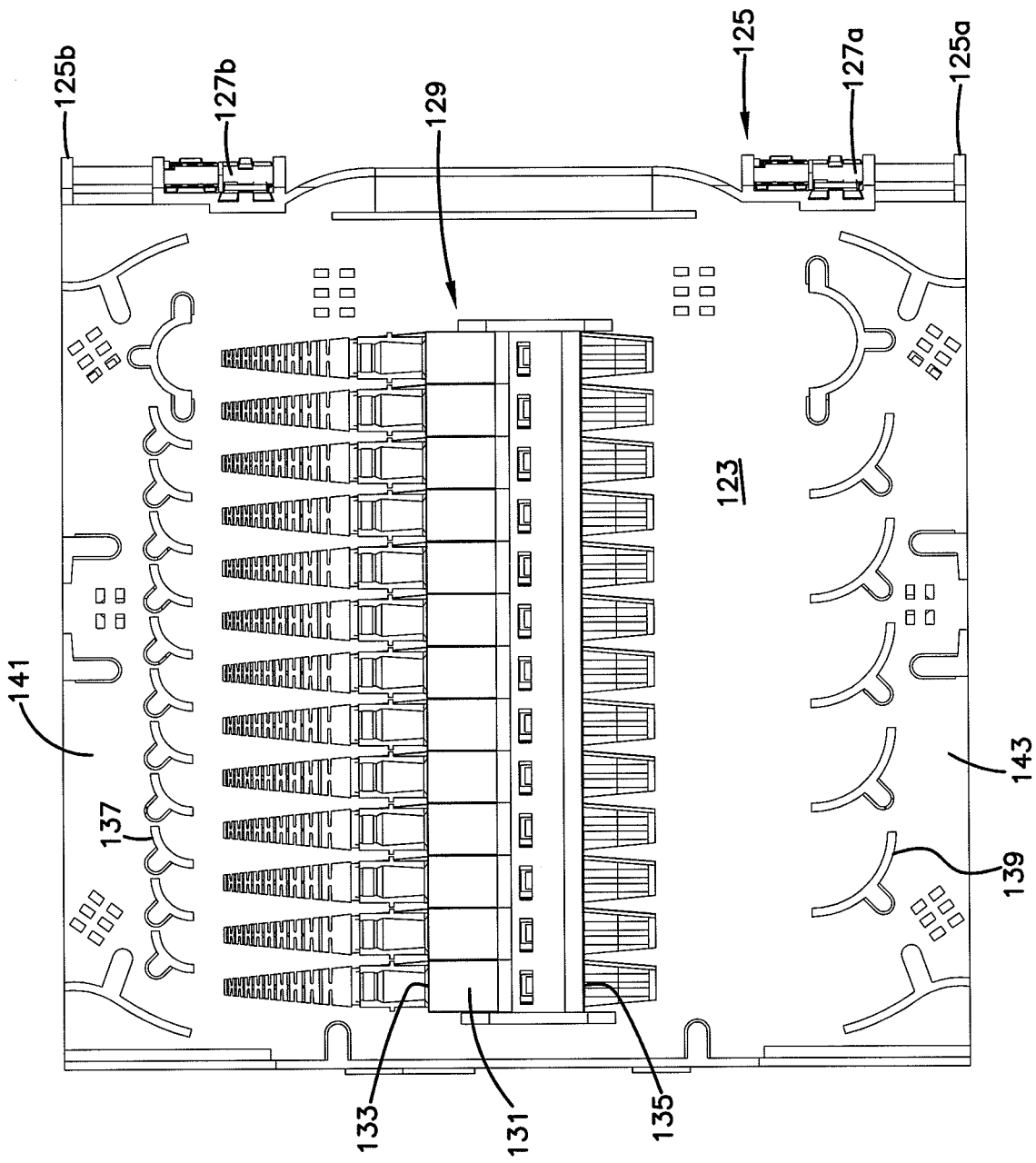
FIG. 7 is a top view of a third tray of the cable spool assembly of FIG. 5.
Figure 10:
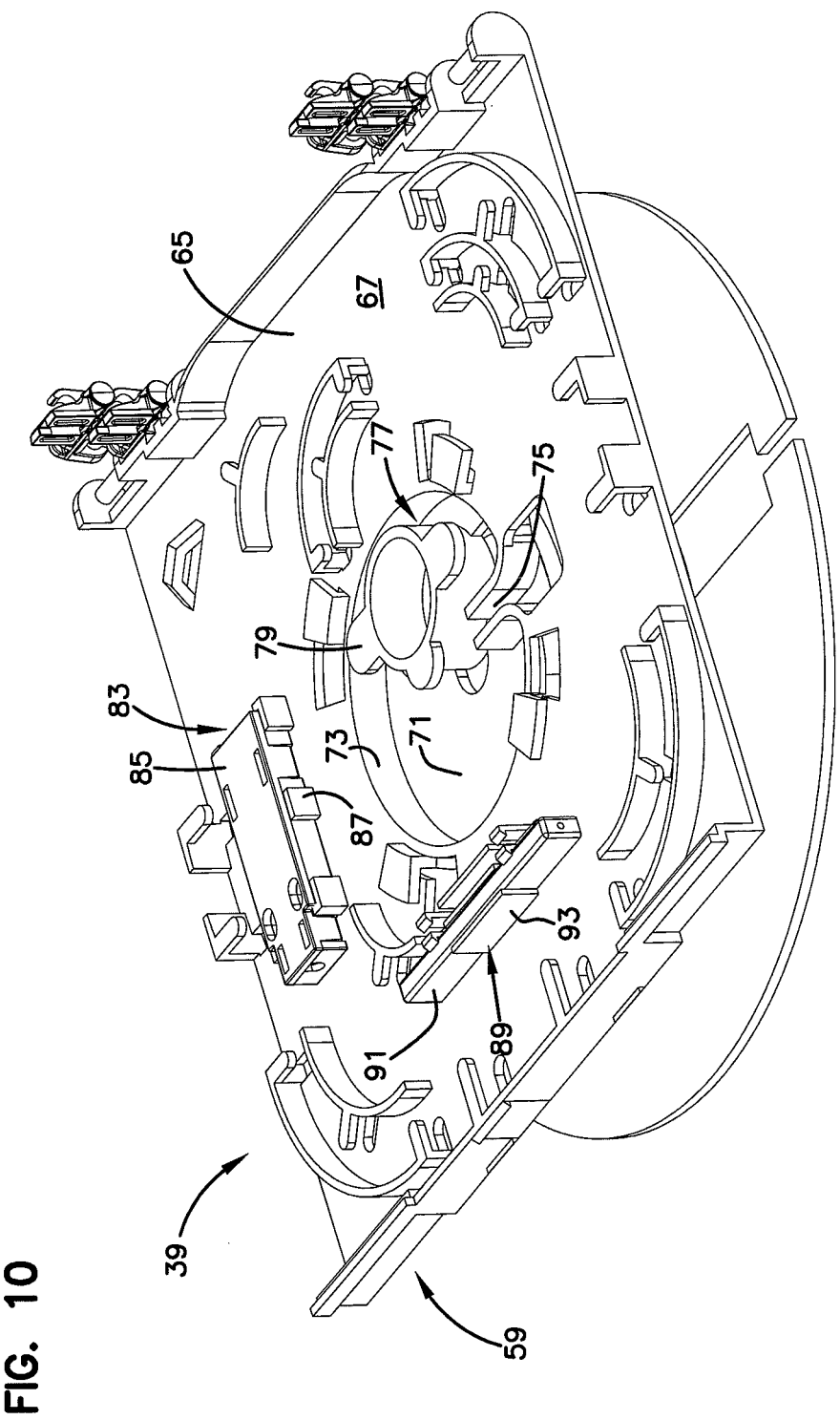
FIG. 10 is a perspective view of the cable spool assembly of FIG. 5 with a tray assembly having only a first tray.
Figure 11:
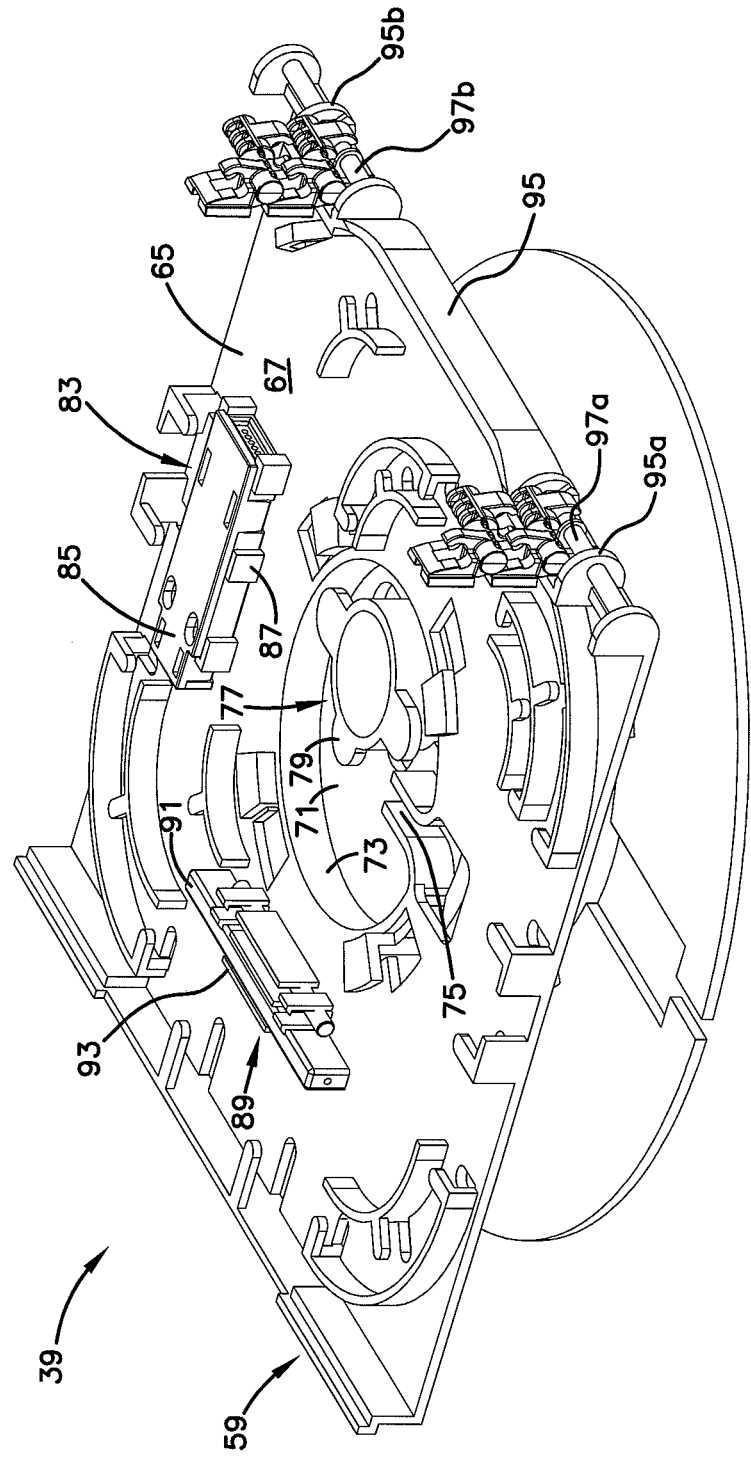
FIG. 11 is another perspective view of the cable spool assembly of FIG. 10.
Figure 12:
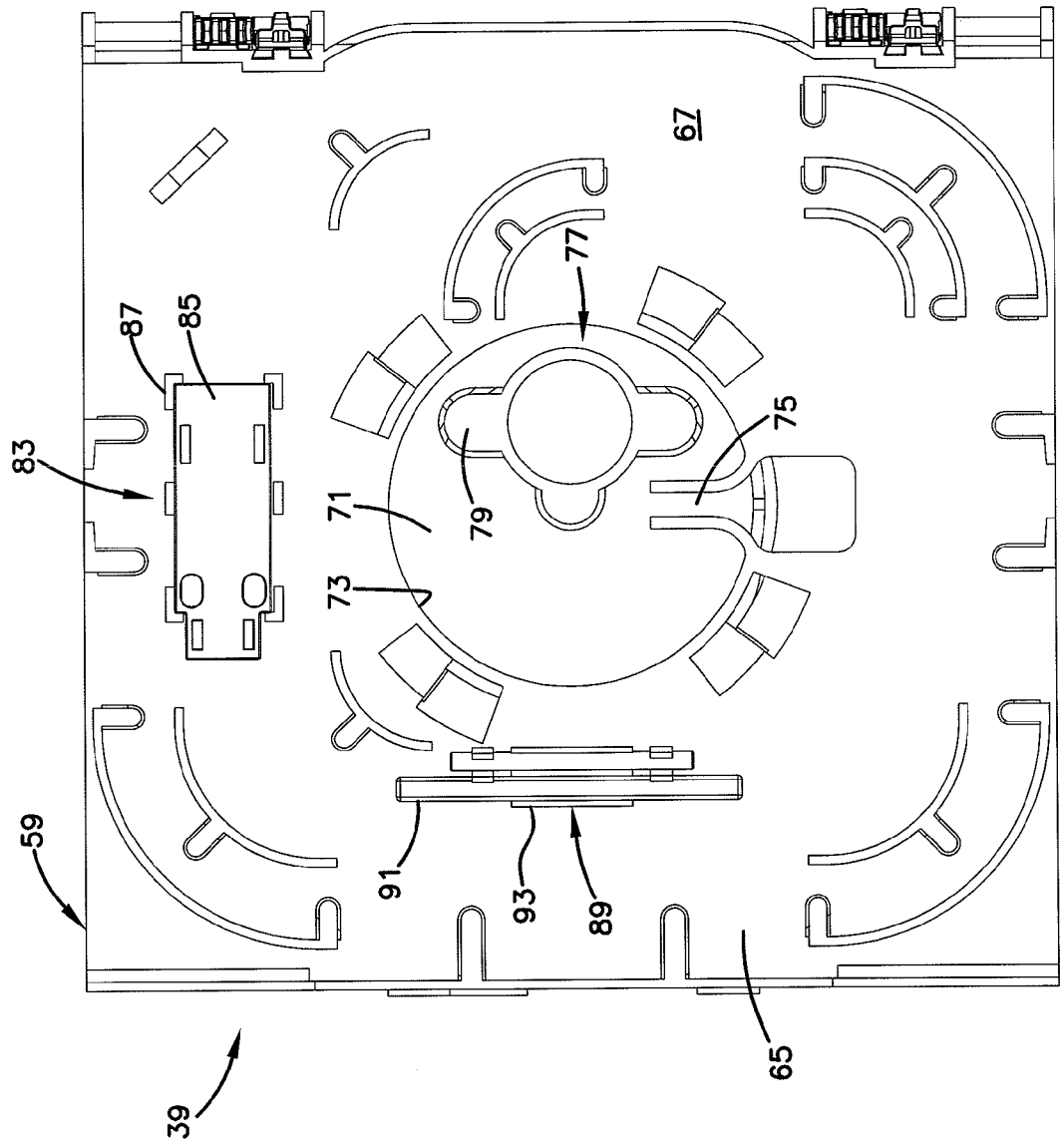
FIG. 12 is a top view of the first tray of FIG. 10.
Figure 14:
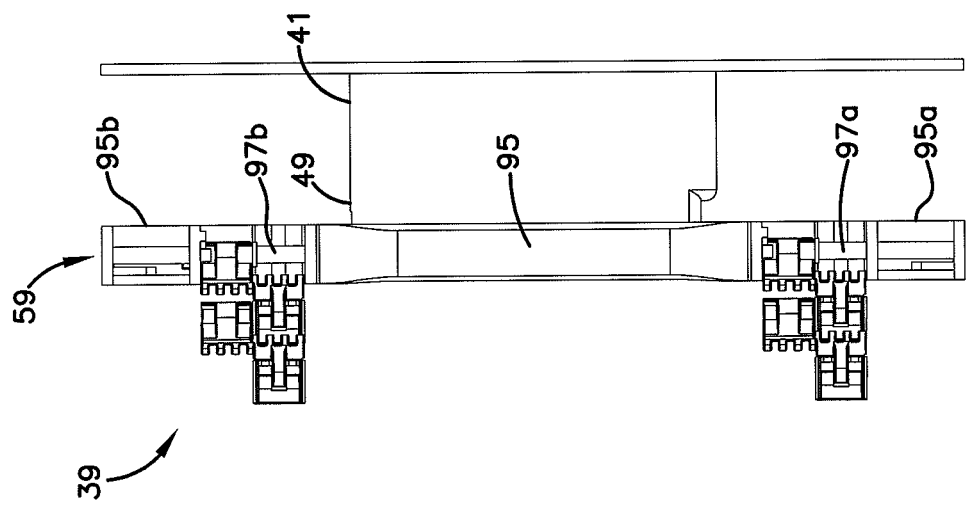
FIG. 14 is a left side view of the cable spool assembly of FIG. 10.
Figure 13:
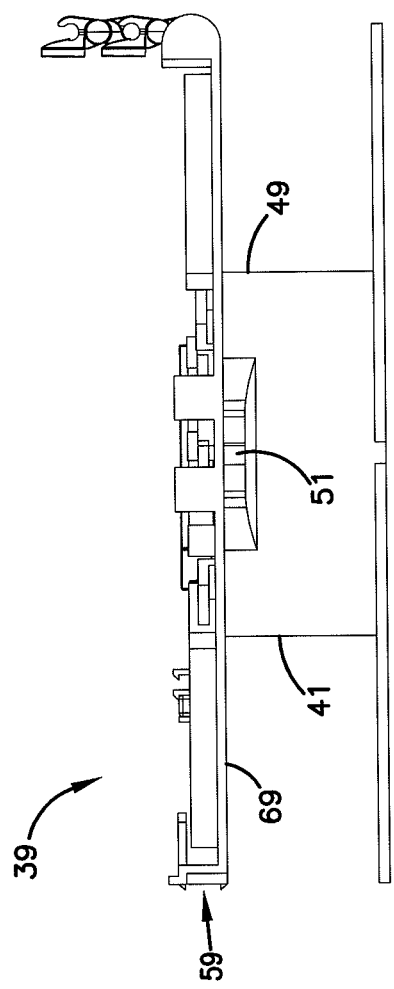
FIG. 13 is a front side view of the cable spool assembly of FIG. 10.

Referring now to FIGS. 2-4, the fiber optic enclosure 21 is shown. The fiber optic enclosure 21 includes a housing, generally designated 25. The housing 25 includes a base 27 and a cover 29 engaged to the base 27. In one embodiment, the cover 29 is pivotally engaged with the base 27.

The base 27 includes a base wall 31, a first sidewall 33 and an oppositely disposed second sidewall 35. The first and second sidewalls 33, 35 extend outwardly from the base wall 31 so that the base wall 31 and the first and second sidewalls 33, 35 cooperatively define an interior region 37.

Referring now to FIGS. 2-9, a cable spool assembly, generally designated 39, is shown. The cable spool assembly 39 is rotatably disposed in the interior region 37 of the housing 25 of the fiber optic enclosure 21. The cable spool assembly 39 is adapted to rotate about a rotation axis 40 of the fiber optic enclosure 21. In the depicted embodiment, the cable spool assembly 39 includes a drum portion 41, a flange 43 and a tray assembly 45.

The drum portion 41 is generally cylindrical in shape. The drum portion 41 is adapted to receive the distribution cable 22 (shown schematically in FIG. 1) so that the distribution cable 22 is coiled around the drum portion 41. In the subject embodiment, a first length of distribution cable 22 is coiled around the drum portion 41 of the cable spool assembly 39.

The first length of distribution cable 22 includes an installation length, which is sufficiently long to extend from the mounting location of the fiber optic enclosure 21 to the fiber distribution hub 17, and an excess length, which is the length of distribution cable 22 remaining on the cable spool assembly 39 after the installation length has been paid out. In one embodiment, the first length is greater than or equal to about 100 feet, 200 feet, 300 feet, 400 feet or 500 feet. In another embodiment, the first length of distribution cable 22 is in the range of about 100 to about 2,000 feet, about 100 to about 1,500 feet, about 500 to about 1,500 feet, or about 100 to about 500 feet.

In one embodiment, a second length, or the excess length, of distribution cable 22 is stored around the cable spool assembly 39 after a length of distribution cable 22 has been paid out. If the first length of distribution cable 22 is greater than the installation length of distribution cable 22, the second length, or excess length, is stored around the drum portion 41 of the cable spool assembly 39.

The drum portion 41 of the cable spool assembly 39 includes a first axial end portion 47 and an oppositely disposed second axial end portion 49. The first axial end portion 47 is engaged to the flange 43 while the second axial end 49 is engaged to the tray assembly 45. In the subject embodiment, the first axial end portion 47 and the flange 43 are integral or monolithic (i.e., no seams, joints or welds provided for connecting the first axial end portion 47 to the flange 43).

The flange 43 extends outwardly from the first axial end portion 47 of the drum portion 41 in a generally radial direction. In the depicted embodiment, the flange 43 is generally perpendicular to a central longitudinal axis 50 of the drum portion 41.

The flange 43 includes an outer diameter that is greater than an outer diameter of the drum portion 41 of the cable spool assembly 39. The outer diameter of the flange 43 is sized to fit between the first and second sidewalls 33, 35 of the housing 25 of the fiber optic enclosure 21 so that the cable spool assembly 39 can rotate without interference between the flange 43 and the first and second sidewalls 33, 35 of the housing 25.

The second axial end portion 49 defines an opening 51 that leads to a bore of the drum portion 41. The opening 51 is adapted to receive the second end portion 24 of the distribution cable 22. The opening 51 includes a first side 53 and an oppositely disposed second side 55. In the depicted embodiment, each of the first and second sides 53, 55 of the opening 51 has an arcuate shape. The arcuate shape of the first and second sides 53, 55 reduces the risk of the distribution cable 22 that enters the opening 51 from being bent beyond the minimum bend radius of the distribution cable 22.

Referring now to FIGS. 5-21, the tray assembly 45 will be described. The tray assembly 45 includes a plurality of trays 57. In the depicted embodiment of FIG. 3, the tray assembly 45 includes a first tray 59, a second tray 61 and a third tray 63.

Referring now to FIGS. 10-14, the first tray 59 is shown. The first tray 59 is engaged with the second axial end portion 49 of the drum portion 41 of the cable spool assembly 39. In one embodiment, the first tray 59 is in snap-fit engagement with the second axial end portion 49 of the drum portion 41 of the cable spool assembly 39. In another embodiment, the first tray 59 is in tight-fit engagement with the bore of the drum portion 41 of the cable spool assembly 39.

The first tray 59 includes base panel 65 having a first surface 67 and an oppositely disposed second surface 69. In the depicted embodiment, the first tray 59 includes a recess portion 71. The recess portion 71 extends outwardly from the base panel 65 in a direction that is outward from the second surface 69. The recess portion 71 is sized and configured to fit within the bore of the drum portion 41 of the cable spool assembly 39. At the first surface 67 of the base panel 65, the recess portion 71 forms a cavity 73.

The recess portion 71 of the first tray 59 defines a passage 75. When the first tray 59 is engaged to the second axial end portion 49 of the drum portion 41 of the cable spool assembly 39, the passage 75 is generally aligned with the opening 51 in the second axial end portion 49 of the drum portion 41 so that the second end portion 24 (shown schematically in FIG. 1) of the distribution cable 22 enters the cavity 73 of the first tray 59 through the opening 51 in the drum portion 41 of the cable spool assembly 39 and the passage 75 of the first tray 59.

In one embodiment, the recess portion 71 is a separate component from the first tray 59. In this embodiment, the recess portion 71 is in snap fit engagement with the base panel 65. In another embodiment, the recess portion 71 is integral with the base panel 65.

The first tray 59 further includes a strain relief spool 77. The strain relief spool 77 extends outwardly from the first surface 67 of the first tray 59. In the depicted embodiment, the strain relief spool 77 is disposed in the cavity 73 of the recess portion 71. The strain relief spool 77 is generally cylindrical in shape. In the depicted embodiment, the strain relief spool 77 is disposed in the cavity 73 so that the passage 75 is generally tangent to the strain relief spool 77.

The strain relief spool 77 is adapted to receive the second end portion 24 of the distribution cable 22. The second end portion 24 of the distribution cable 22 is wrapped or coiled around the strain relief spool 77. In one embodiment, the second end portion 24 of the distribution cable 22 is wrapped around the strain relief spool 77 at least one time. In another embodiment, the second end portion 24 of the distribution cable 22 is wrapped around the strain relief spool 77 at least two times. In another embodiment, the second end portion 24 of the distribution cable 22 is wrapped around the strain relief spool 77 at least three times.

The strain relief spool 77 includes a plurality of projections 79. The projections 79 extend outwardly in a radial direction from an axial end 81 of the strain relief spool 77. The projections 79 are adapted to retain the second end portion 24 of the distribution cable 22 on the strain relief spool 77.

The first tray 59 includes a fan-out holder 83. The fan-out holder 83 is adapted to retain a fan-out 85. The fan-out 85 fans-out or spreads apart optical fibers of the distribution cable 22.

In one embodiment, the fan-out holder 83 includes a plurality of latches 87. The latches 87 retain the fan-out 85 through snap-fit engagement. In another embodiment, the latches 87 retain the fan-out 85 through tight-fit engagement.

The first tray 59 further includes a splitter holder 89. The splitter holder 89 is adapted to receive a splitter 91. The splitter 91 is adapted to split an incoming optical signal into a plurality of outgoing optical signals. In one embodiment, the splitter 91 is a 1×2, 1×4 or 1×8 splitter. The splitter holder 89 includes a plurality of latches 93. In one embodiment, the splitter 91 is in snap-fit engagement with the latches 93 of the splitter holder 89.

The first tray 59 further includes a first side 95. The first side 95 of the first tray 59 includes a first plurality of hinge pins 97. A first hinge pin 97a is disposed at a first end 95a of the first side 95 while a second hinge pin 97b is disposed at a second end 95b of the first side 95.

Referring now to FIGS. 15-19, the second tray 61 is shown. The second tray 61 is pivotally engaged with the first tray 59. The second tray 61 includes a first side 99. The first side 99 includes a second plurality of hinge pins 101. A first hinge pin 101a is disposed at a first end 99a of the first side 99 while a second hinge pin 101b is disposed at a second end 99b of the first side 99. In the depicted embodiment, the second tray 61 is engaged to the first tray 59 so that the first side 95 of the first tray 59 is generally aligned with the first side 99 of the second tray 61.

Figure 16:
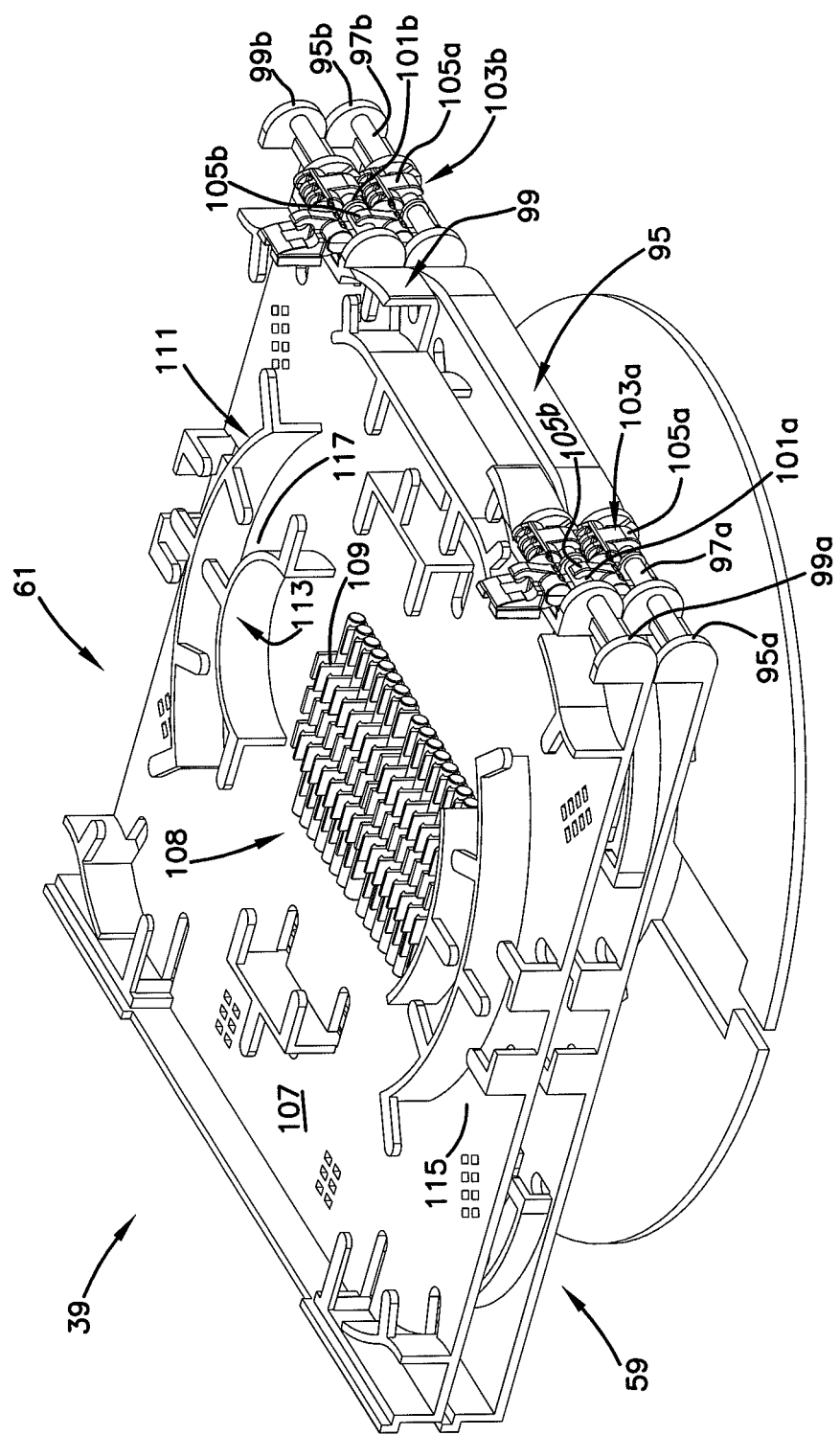
FIG. 16 is another perspective view of the cable spool assembly of FIG. 15.
Figure 20:
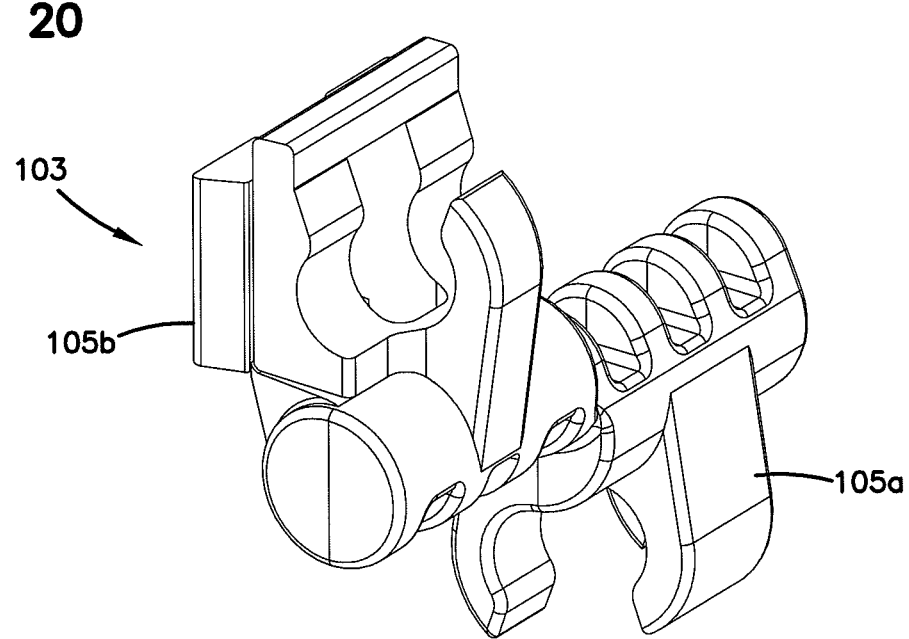
FIG. 20 is a perspective view of a pivot linkage suitable for use with the cable spool assembly of FIG. 5.
Figure 21:
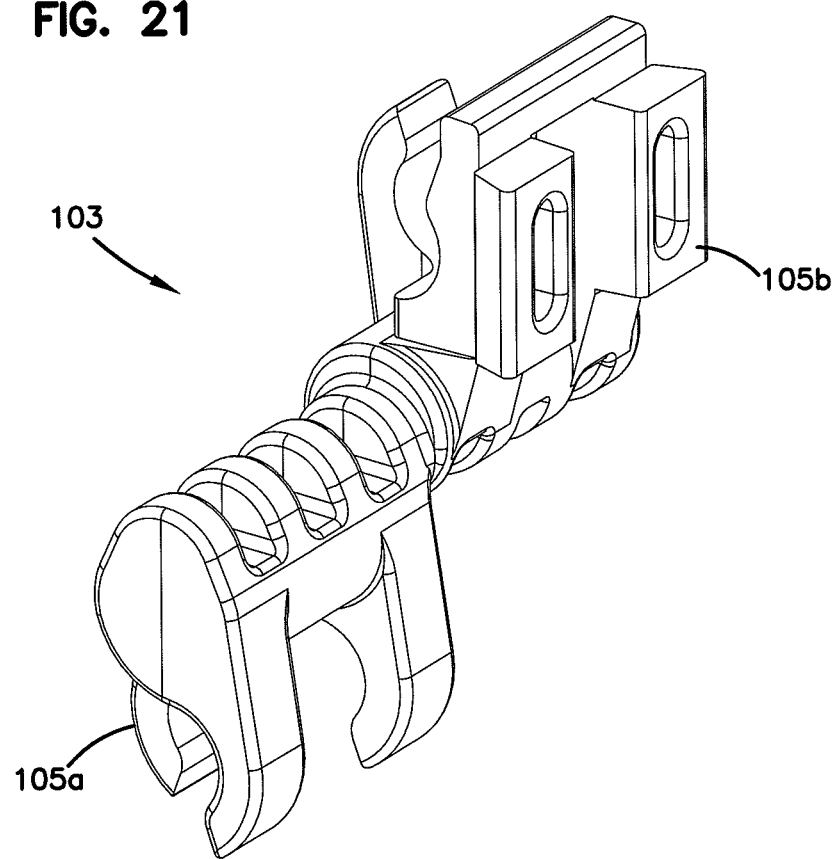
FIG. 21 is another perspective view of the pivot linkage of FIG. 20.

Referring now to FIGS. 16 and 20-21, the second tray 61 is pivotally engaged to the first tray 59 by a pivot linkage 103. The pivot linkage 103 includes a first coupling section 105a and an oppositely disposed second coupling section 105b. The second coupling section 105b extends in a direction that is opposite from the direction of the first coupling section 105a. A pivot linkage that is suitable for use with the tray assembly 45 has been described in U.S. patent application Ser. No. 12/425,241 entitled "Fiber Optic Splice Tray" and filed on May 15, 2009. The disclosure of U.S. patent application Ser. No. 12/425,241 is hereby incorporated by reference in its entirety.

The first coupling section 105a of a first pivot linkage 103a is engaged to the first hinge pin 97a at the first end 95a of the first side 95 of the first tray 59. The second coupling section 105b of the first pivot linkage 103a is engaged to the first hinge pin 101a of the first end 99a of the first side 99 of the second tray 61.

The first coupling section 105a of a second pivot linkage 103b is engaged to the second hinge pin 97b at the second end 95b of the first side 95 of the first tray 59. The second coupling section 105b of the second pivot linkage 103b is engaged to the second hinge pin 101b of the second end 99b of the first side 99 of the second tray 61.

Figure 15:
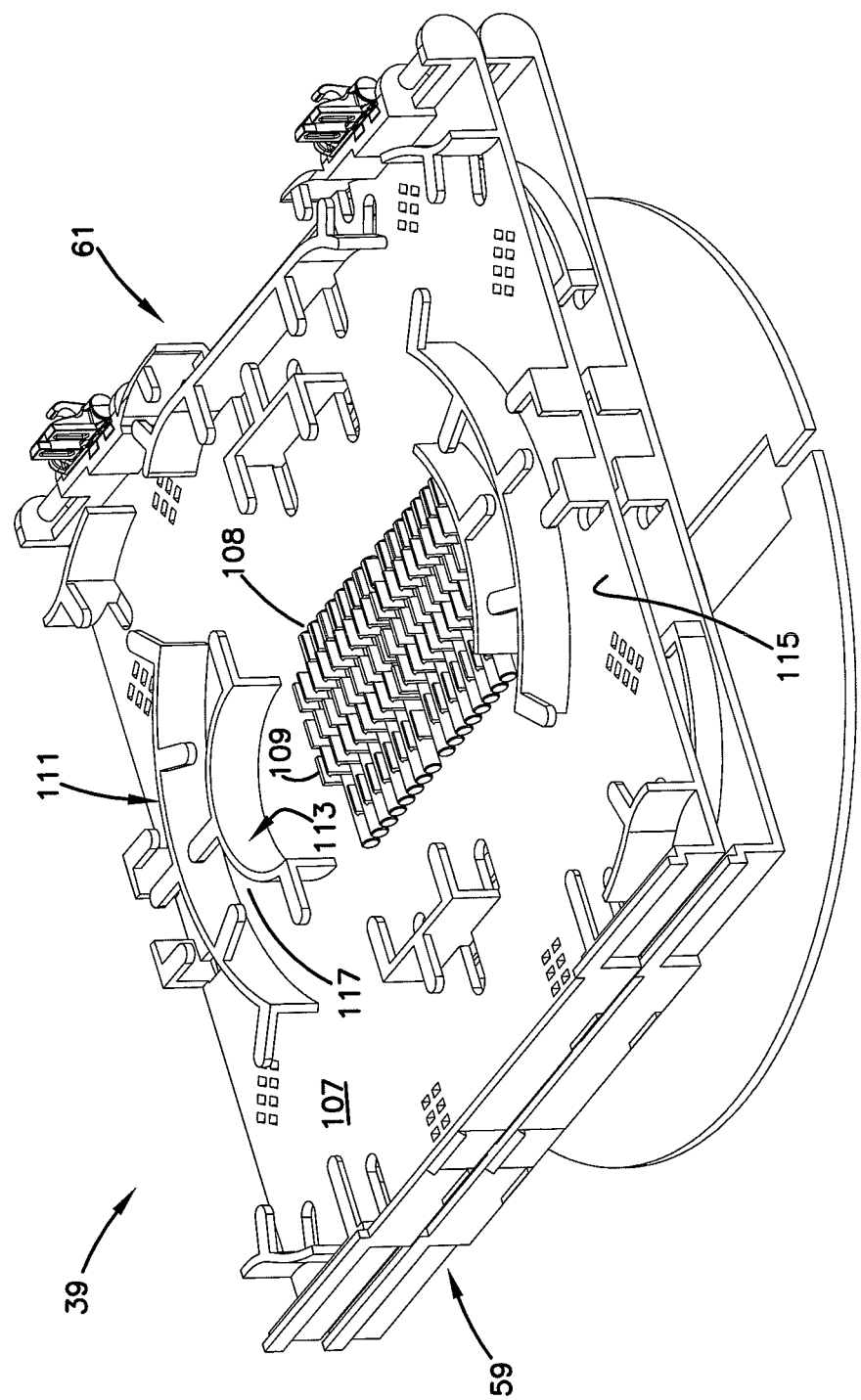
FIG. 15 is a perspective view of the cable spool assembly of FIG. 5 with the tray assembly having only the first tray and a second tray.
Figure 17:
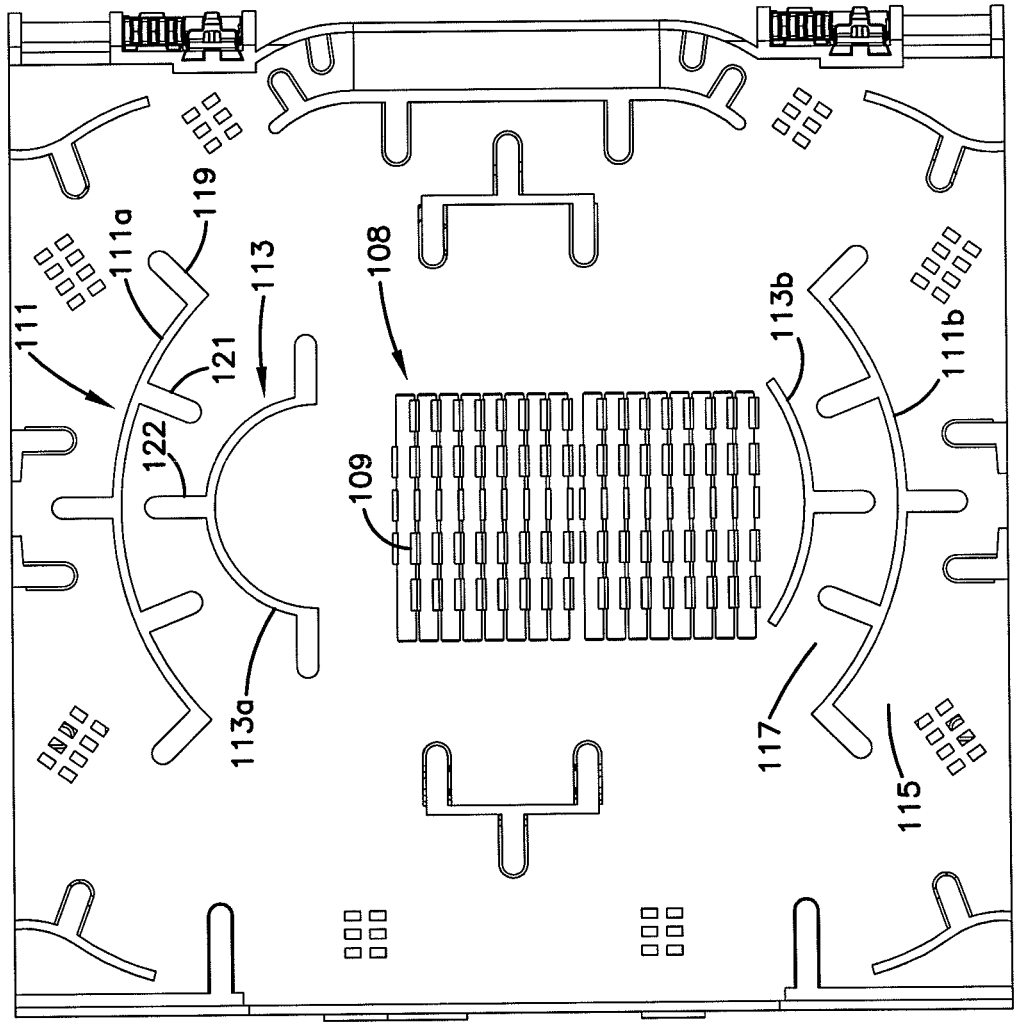
FIG. 17 is a top view of the first tray of FIG. 15.
Figure 19:
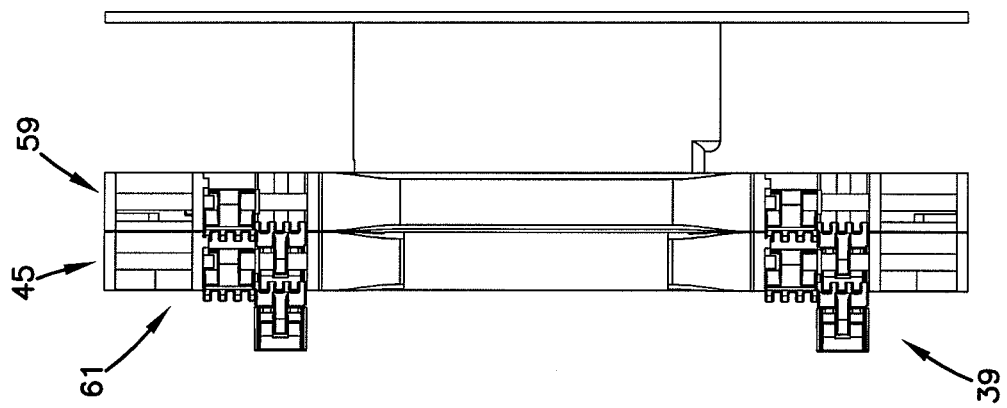
FIG. 19 is a left side view of the cable spool assembly of FIG. 15.
Figure 18:
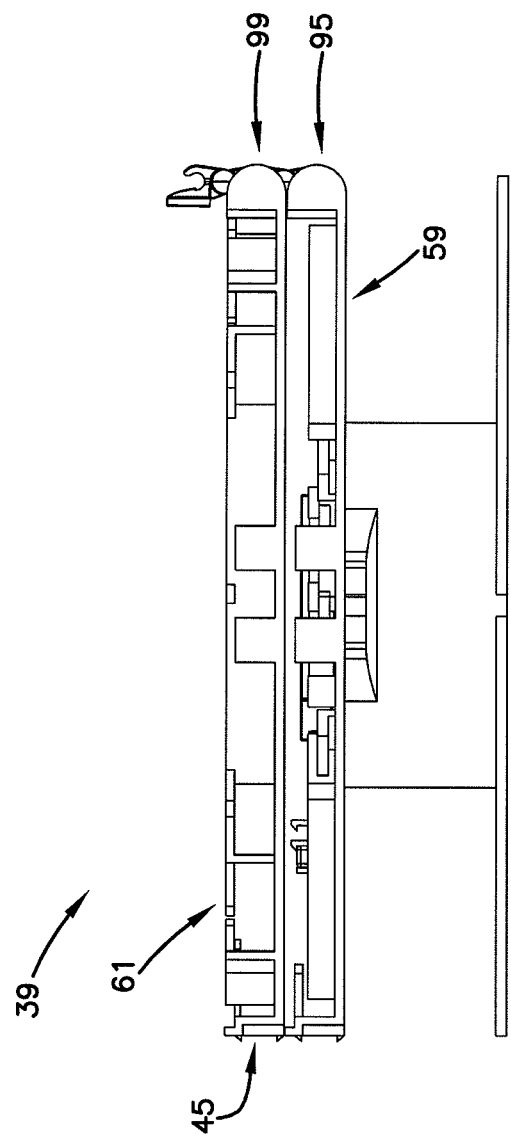
FIG. 18 is a front side view of the cable spool assembly of FIG. 15.

Referring now to FIGS. 15-17, the second tray 61 includes base panel 107. In the depicted embodiment, the first side 99 extends outwardly from the base panel 107 in a generally perpendicular direction. The base panel 107 includes a splice holder 108. The splice holder 108 is adapted to secure a plurality of splices. Each of the splices joins a first optical fiber to a second optical fiber. In the subject embodiment, the splice holder 108 includes a plurality of resilient latches 109. The resilient latches 109 secure the splices in the splice holder 108 by a snap-fit engagement.

The second tray 61 includes a first plurality of walls 111 and a second plurality of walls 113. The first and second pluralities of walls 111, 113 extend outwardly from the base panel 107. The first plurality of walls 111 defines a first cable path 115 while the second plurality of walls 113 defines a second cable path 117. In the depicted embodiment, the second cable path 117 is disposed within the first cable path 115.

The first plurality of walls 111 includes a first outer wall 111a and a second outer wall 111b. The second outer wall 111b is oppositely disposed from the first outer wall 111a along the first cable path 115. Each of the first and second outer walls 111a, 111b is generally arcuate in shape. The arcuate shape of the first and second outer walls 111a, 111b forms the first cable path 115 so that the first cable path 115 is generally obround. The first and second outer walls 111a, 111b have a radius that is greater than the minimum bend radius of the optical fiber being coiled around the first cable path 115.

Each of the first and second outer walls 111a, 111b includes a plurality of outer projections 119 and a plurality of inner projections 121. The plurality of outer projections 119 extends outwardly from the first and second outer walls 111a, 111b so that the plurality of outer projections 119 extends over a portion of the first cable path 115. In the depicted embodiment, each of the plurality of outer projections 119 of the first and second outer walls 111a, 111b includes three outer projections 119.

The plurality of inner projections 121 extends inwardly from the first and second outer walls 111a, 111b in a direction that is opposite the direction of the plurality of outer projections 119. The plurality of inner projections 121 extends over a portion of the second cable path 117. In the depicted embodiment, each of the plurality of inner projections 121 of the first and second outer walls 111a, 111b includes two inner projections 121.

The second plurality of walls 113 includes a first inner wall 113a and a second inner wall 113b. The second inner wall 113b is oppositely disposed from the first inner wall 113a along the second cable path 117. The first and second inner walls 113a, 113b are disposed between the first and second outer walls 111a, 111b.

Each of the first and second inner walls 113a, 113b is generally arcuate in shape. The arcuate shape contributes to the generally obround shape of the second cable path 117. The second inner wall 113b is generally semi-circular in shape. The first and second inner walls 113a, 113b have a radius that is greater than the minimum bend radius of the optical fiber being coiled around the second cable path 117.

Each of the first and second inner walls 113a, 113b includes a projection 122. The projection 122 extends outwardly from the first and second inner walls 113a, 113b so that the projection extends over a portion of the second cable path 117.

The splice holder 108 is disposed between the first and second inner walls 113a, 113b of the second plurality of walls 113. In the depicted embodiment, the splice holder 108 is disposed closer to the first inner wall 113a than the second inner wall 113b.

Referring now to FIGS. 5-9, the third tray 63 is shown. The third tray 63 is pivotally engaged to the second tray 61.

The third tray 63 includes a base wall 123. A first side 125 extends outwardly from the base wall 123. In the depicted embodiment, the first side 125 extends outwardly from the base wall 123 in a generally perpendicular direction.

The first side 125 includes a third plurality of hinge pins 127. A first hinge pin 127a is disposed at a first end 125a of the first side 125 while a second hinge pin 127b is disposed at a second end 125b of the first side 125. In the depicted embodiment, the third tray 63 is engaged to the second tray 61 so that the first side 125 of the third tray 63 is generally aligned with the first side 99 of the second tray 61.

In the depicted embodiment, the third tray 63 is pivotally engaged to the second tray 61 by the pivot linkage 103 (shown in FIGS. 20 and 21). The first coupling section 105a of a third pivot linkage 103c is engaged to the first hinge pin 101a at the first end 99a of the first side 99 of the second tray 61. The second coupling section 105b of the third pivot linkage 103c is engaged to the first hinge pin 127a of the first end 125a of the first side 125 of the third tray 63.

The first coupling section 105a of a fourth pivot linkage 103d is engaged to the second hinge pin 101b at the second end 99b of the first side 99 of the second tray 61. The second coupling section 105b of the fourth pivot linkage 103d is engaged to the second hinge pin 127b of the second end 125b of the first side 125 of the third tray 63.

The third tray 63 includes a termination region 129 mounted to the base wall 123. The termination region 129 includes a plurality of adapters 131. Each of the adapters 131 includes a first port 133 and an oppositely disposed second port 135. The first port 133 is adapted to receive a connectorized end of an optical fiber from the second tray 61. The second port 135 is adapted to receive a connectorized end of an optical fiber of an outgoing fiber optic cable.

The third tray 63 further includes a first plurality of bend radius protectors 137 and a second plurality of bend radius protectors 139. The first plurality of bend radius protectors 137 is disposed adjacent a first end 141 of the base wall 123 while the second plurality of bend radius protectors 139 is disposed adjacent an oppositely disposed second end 143. The first plurality of bend radius protectors 137 is adapted to direct optical fibers to the first port 133 of the plurality of adapters 131 while the second plurality of bend radius protectors 139 is adapted to direct optical fibers to the second port 135. In the depicted embodiment, the termination region 129 is disposed between the first and second pluralities of bend radius protectors 137, 139.

Referring now to FIGS. 2-4, the use of the fiber optic enclosure 21 will be described. The first sidewall 33 of the fiber optic enclosure 21 includes a first cable opening 143 and a second cable opening 145. In the depicted embodiment, the first cable opening 143 is a slot that extends from a first edge 147 of the first sidewall 33 to an oppositely disposed second edge 149 (i.e., a height H of the first sidewall 142). The second cable opening 145 is a slot that extends from the first edge 147 of the sidewall to a location between the first and second edges 147, 149.

Each of the first and second cable openings 143, 145 includes a foam insert 151. The foam insert 151 includes a slit 153 that is adapted to receive a portion of the distribution cable 22 and a portion of a subscriber cable.

In one embodiment, the fiber optic enclosure 21 is mounted to a mounting location (e.g., a vertical mounting location, a wall, a post, etc.). With the fiber optic enclosure 21 mounted to the mounting location, the installation length of distribution cable 22 is paid out from the cable spool assembly 39. The installation length of the distribution cable 22 is paid out through the first opening 143 of the fiber optic enclosure 21. As the installation length is paid out, the cable spool assembly 39 rotates in the fiber optic enclosure 21 about a rotation axis that is aligned with a central axis of the drum portion 41. Since the tray assembly 45 is engaged to the drum portion 41, the tray assembly 45 rotates in unison with the drum portion 41 about the rotation axis.

In one embodiment, the connectorized ends of the distribution cable 22 are engaged to the first ports 133 of the adapters 131 of the third tray 63 of the tray assembly 45. As the tray assembly 45 rotates in unison with the cable spool assembly 39, the connectorized ends are able to remain engaged with the first ports 133 as the cable spool assembly 39 rotates about the rotation axis.

To connect the subscriber cables to the paid out distribution cable 22, the subscriber cables are first routed into the fiber optic enclosure 21 through the second opening 145. Connectorized ends of the subscriber cable are then engaged with the second ports 135 of the adapters 131 of the third tray 63. In one embodiment, excess length of the distribution cable 22 is coiled around a cable management spool 155 that is disposed adjacent to the sidewall 141 of the fiber optic enclosure 21.

In one aspect of the present disclosure, the tray assembly 45 is modular. As a modular tray assembly 45, the second and third trays 61, 63 can be added to the cable spool assembly 39 of the fiber optic enclosure 21 when needed following the mounting of the fiber optic enclosure 21 to the mounting location. In one embodiment, the second tray 61 is pivotally mounted to the first tray 59 following the mounting of the fiber optic enclosure 21 to the mounting location. In another embodiment, the third tray 63 is pivotally mounted to the second tray 61 following the mounting of the second tray 61 to the first tray 59.

The fiber optic enclosure 21 is potentially advantageous as it provides a compact enclosure. The compactness of the fiber optic enclosure 21 is provided in part by the stacked configuration of the tray assembly 45. While the tray assembly 45 is disposed in a stacked configuration, the first, second and third trays 59, 61, 63 of the tray assembly 45 are accessible through the pivotal engagement of the first, second and third trays 59, 61, 63.

The second and third trays 61, 63 of the tray assembly 45 pivot between a closed position (shown in FIG. 3) and an open position (shown in FIG. 4). In one embodiment, the open position is 90 degrees from the closed position. In another embodiment, the open position is 180 degrees from the closed position.

To access the first tray 59, the second and third trays 61, 63 are pivoted to the open position. To access the second tray 61, the second tray 61 is in the closed position while the third tray 63 is pivoted to the open position.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

The invention claimed is:

1. A fiber optic enclosure configured to store at least a portion of an optical cable, the fiber optic enclosure comprising:
    a housing having a base and a cover that cooperate to define an interior, the cover being movable relative to the base to provide access to the interior, the housing defining a cable port through which an optical cable may extend to exit the housing;
    a cable spool assembly disposed within the interior of the housing, the cable spool assembly including:
        a drum that is rotatable relative to the housing,
        a splice tray that rotates with the drum relative to the housing, the splice tray configured to hold an optical splice, and
        a termination tray that rotates with the drum relative to the housing, the termination tray configured to hold an optical adapter, the termination tray being movable relative to the drum.

2. The fiber optic enclosure of claim 1, wherein the termination tray is configured to pivot relative to the drum.

3. The fiber optic enclosure of claim 1, wherein the termination tray is configured to move relative to the splice tray.

4. The fiber optic enclosure of claim 3, wherein the termination tray is configured to pivot relative to the splice tray.

5. The fiber optic enclosure of claim 4, wherein the splice tray is configured to pivot relative to the drum.

6. The fiber optic enclosure of claim 3, wherein the termination tray is configured to pivot relative to the drum.

7. The fiber optic enclosure of claim 1, wherein the cable spool assembly also includes a transition tray coupled to the drum, the splice tray being coupled to the transition tray.

8. The fiber optic enclosure of claim 7, wherein the termination tray is coupled to the transition tray via the splice tray.

9. The fiber optic enclosure of claim 7, wherein the transition tray includes an optical splitter holder.

10. The fiber optic enclosure of claim 7, wherein the transition tray includes a fanout holder.

11. The fiber optic enclosure of claim 7, wherein the transition tray includes a strain-relief spool.

12. The fiber optic enclosure of claim 1, further comprising the portion of the optical cable wound around the drum, the optical cable extending through the cable port defined by the housing.

13. The fiber optic enclosure of claim 1, wherein the termination tray is configured to hold a plurality of optical adapters including the optical adapter.

14. The fiber optic enclosure of claim 1, wherein the splice tray is configured to hold a plurality of optical splices including the optical splice.

15. The fiber optic enclosure of claim 1, wherein the termination tray stacks over the splice tray.

16. The fiber optic enclosure of claim 1, wherein the housing defines a second port through which a cable extending to the optical adapter on the termination tray enters the housing.

17. The fiber optic enclosure of claim 16, wherein the second port is defined at a common wall with the cable port.

18. The fiber optic enclosure of claim 17, further comprising a foam insert extending across the first and second cable ports.

19. The fiber optic enclosure of claim 1, further comprising a foam insert extending across the first cable port.

20. The fiber optic enclosure of claim 1, further comprising a foam insert extending across the second cable port.

* * * * *